United States Patent [19]

Harrison et al.

[11] 3,818,485

[45] June 18, 1974

[54] KEYBOARD APPARATUS

[75] Inventors: Wesley V. Harrison; Wilbur A. Foster, both of Austin, Tex.

[73] Assignee: Western Digital Systems, Inc., Austin, Tex.

[22] Filed: Mar. 30, 1973

[21] Appl. No.: 346,666

[52] U.S. Cl. .................... 340/365 P, 250/220 M X
[51] Int. Cl. .................... H04l 15/06
[58] Field of Search .................... 340/365 P

[56] References Cited

UNITED STATES PATENTS

| | | | |
|---|---|---|---|
| 3,369,643 | 2/1968 | Avegerinos | 340/365 P |
| 3,465,099 | 9/1969 | Harris | 340/365 P |

*Primary Examiner*—Thomas B. Habecker
*Attorney, Agent, or Firm*—Kenneth R. Glaser

[57] ABSTRACT

Disclosed is optical switching keyboard apparatus employing identically constructed aligned matrix panels forming the apparatus housing as well as defining collimated light beams focused upon a photodetector matrix which is disposed in an area on a circuit board which extends transverse to and through slotted apertures in the aligned panels. Coded electrical signals are provided by the translation of coded shutters into selected light interrupting relationship with the beams, the coded shutters effective to block selected apertures of the matrix panels, which apertures are tapered in the direction of the beam travel.

13 Claims, 7 Drawing Figures

KEYBOARD APPARATUS

The present invention relates to keyboard apparatus, more particularly to electrical signal code generating keyboard apparatus, and even more particularly to keyboard apparatus employing the selective interruption of light beams for generating coded input signals to data processing equipment.

Within the last decade, there has been a tremendous growth in the data processing equipment industry. With the increased demand for speed and efficiency in automatically handling data, there has been a corresponding increase in the sophistication and speed of computers to accomplish this purpose. Generally it can be said, however, that the design of apparatus for inputting and outputting this data to and from the computers has lagged that of the computers themselves. This is particularly true in the case of input apparatus utilizing keyboards by which the operators of such manually enter the data by selective depression of the keys, the keyboard apparatus converting the information into coded electrical signals representative of same. These coded signals are then processed by the computer.

Initially, keyboard apparatus of the aforementioned type employed mechanical or electromechanical means, such as electrical contact switches and relays, for effecting the required conversion; and consequently had the normal disadvantages associated with such techniques, primarily restrictions on speed and reliability. To overcome these disadvantages, a system was developed whereby the keyboards employed optical switching, i.e., a plurality of light beams directed at a photosensor matrix or array were selectively interrupted by masks coupled to, and uniquely encoded in a manner to correspond to the information of, the key being depressed. In this way, coded electrical signals were generated at the output of the photocell matrix corresponding to information being entered to the keyboard. While presently employed keyboards utilizing this optical switching or encoding approach have generally severed their intended purpose, they have not been entirely satisfactory for all conditions of service.

It is therefore a principal object of the invention to provide new and improved keyboard apparatus.

It is another object of the invention to provide a new and improved keyboard for converting information into coded electrical signals representative of such information and suitable for processing by computer apparatus coupled thereto.

It is a still further object of the invention to provide a new and improved keyboard apparatus of the type employing optical switching or encoding.

It is an even still further object of the invention to provide optical switching keyboard apparatus which is simple and relatively inexpensive to produce and operate.

In accordance with these and other objects, the keyboard apparatus of the present invention comprises a plurality of adjacently disposed face-engaging matrix panels forming the apparatus housing as well as defining a plurality of collimated light beams longitudinally passing through the housing. Each of the matrix panels is of identical construction and includes uniquely designed apertures which are aligned with corresponding apertures in adjacent panels for forming and directing the light beams at reflector means which redirect the beams at a matrix of photodetectors corresponding to the apertures in the panels. The photodetectors are disposed upon a printed circuit board longitudinally extending through slots disposed within, and maintained in alignment with, the matrix panels in a manner that accurately positions the photocell matrix with the redirected light beams. A plurality of uniquely encoded masks or shutters coupled to the keys of the keyboard are respectively and uniquely positioned between adjacent matrix panels for selectively and uniquely interrupting the light beams in response to the depression of the keys.

These, and other features, advantages, and objects of the invention will become more readily understood from the following detailed description taken in conjunction with the attached drawings wherein like numerals refer to corresponding parts and wherein.

Figure 1:
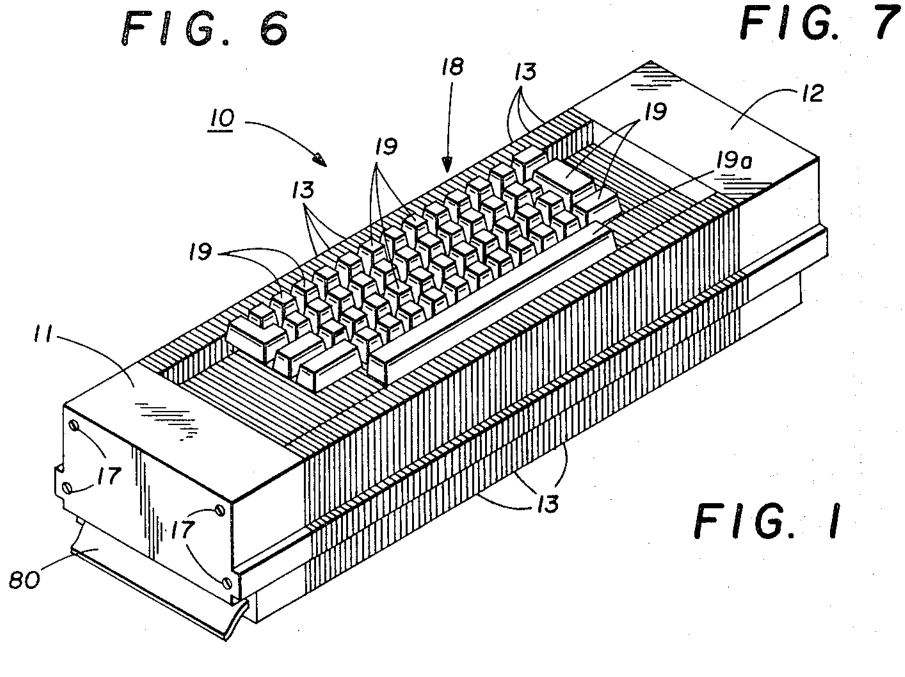
FIG. 1 is a perspective view of the keyboard apparatus constructed in accordance with the present invention.

Referring now to FIG. 1, the optical switching keyboard apparatus 10 in accordance with the present invention includes a housing basically provided by a pair of end caps 11 and 12, between which are disposed a plurality of matrix boards or panels 13 in face engaging relationship with each other and with the end caps 11 and 12, as illustrated. As subsequently described in greater detail, each of the matrix panels 13 are of identical construction; and, along with the end caps 11 and 12, are preferably formed of high quality injection molded plastic. The end caps 11 and 12 and matrix boards 13 are firmly held in assembled relation by longitudinally extending rods 14 (FIG. 3) passing through respective openings 15 and 16 in the panels 13 and end caps 11 and 12, the rods 14 being preferably internally threaded for receiving screws 17 for securing the component housing parts together.

Disposed at the top face of the apparatus 10 is a keyboard 18 having keys 19 and a space bar **19*a* arranged in a manner corresponding to a conventional typewriter keyboard layout. As subsequently described, depression of the individual keys 19 (or space bar 19*a*) is effective to produce correspondingly coded electrical signals from the output of the apparatus 10, these coded signals then being inputted in a conventional manner to data processing equipment, for example, operating in response to the receipt of these coded signals. Specifically, depression of the keys 19 respectively translates uniquely coded shutters 40 coupled thereto, and disposed between the matrix boards 13**, to selectively interrupt light beams longitudinally extending through the housing and so prevent these interrupted beams from impinging upon an array of photodetectors uniquely disposed at one end of the housing.

Figure 2:
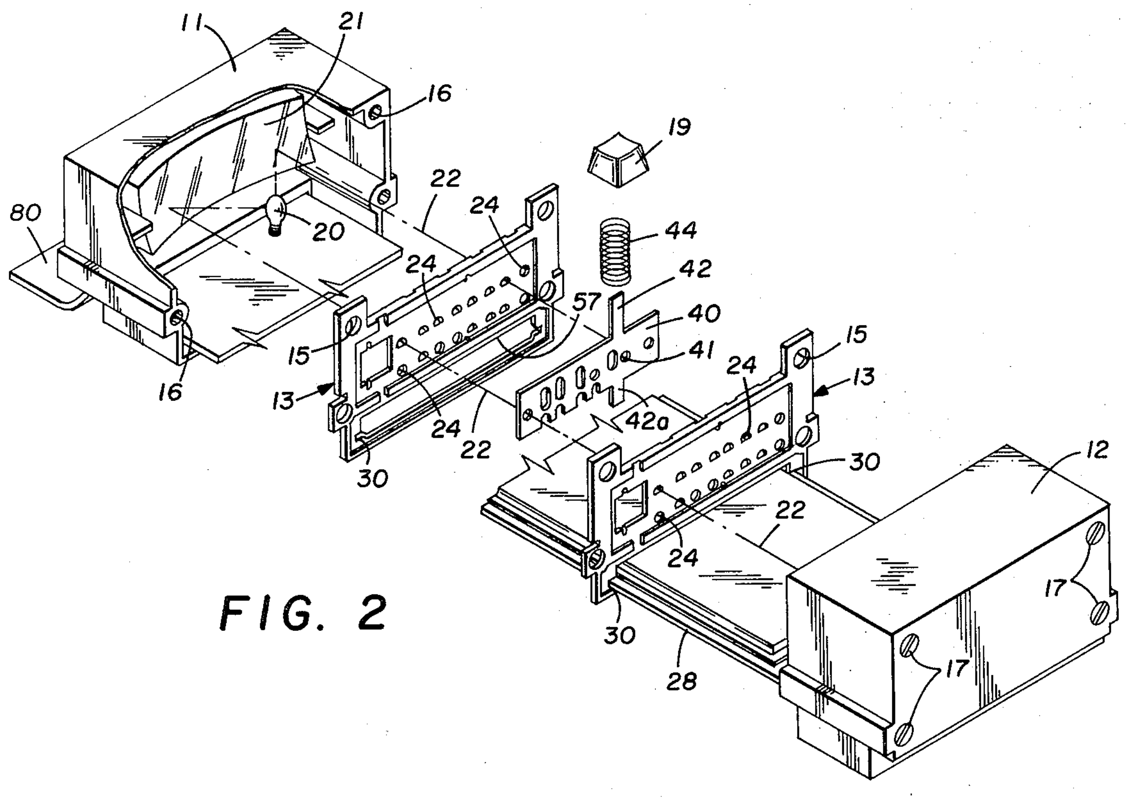
FIG. 2 is an exploded view of the interior of the apparatus illustrated in FIG. 1 at one viewing angle thereof.
Figure 3:
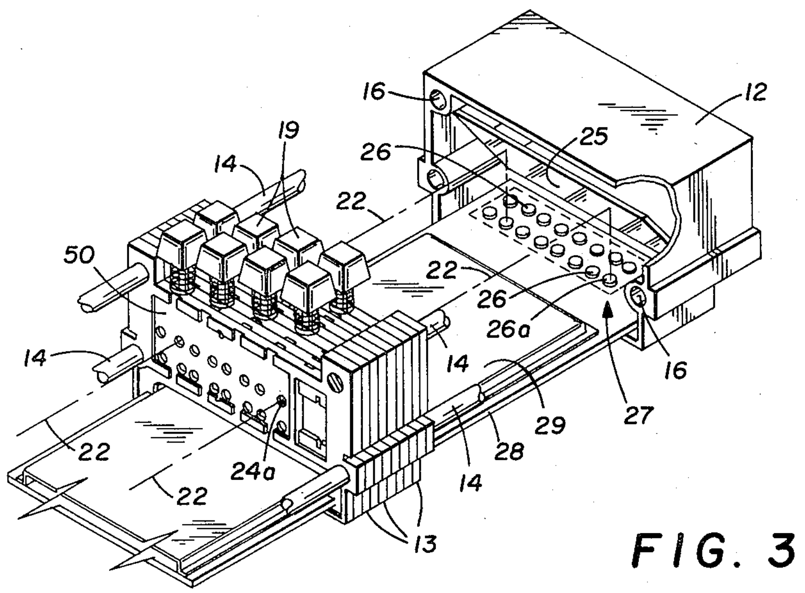
FIG. 3 is a partial view of the interior of the apparatus illustrated in FIG. 1 at an opposite viewing angle from that of FIG. 2.

Refering now to FIGS. 2 and 3, the internal layout within the housing of the apparatus 10 is illustrated. Accordingly, at one end of the apparatus and disposed within the end cap 11, for example, is a light source 20 which, in combination with a reflector means 21, directs light from one end of the housing through apertures 24 in the matrix panels 13 toward the end cap 12, thereby to produce a plurality of collimated light beams 22. Any number of light beams 22 may be so provided, but in accordance with a specific and preferred embodiment of the present invention, the matrix boards 13 have two rows of eight apertures each, thus resulting in the provision of 16 collimated light beams 22 longitudinally passing through the housing.

The source 20 may be mounted in any conventional manner with respect to the reflector 21, and is preferably a single incandescent light. Reflector means 21 is ideally in the form of a parabolic reflecting surface suitably aligned with the source 20 and panels 13 to produce the light which is then shaped into collimated beams 22 by the mutually aligned apertures 24 in adjacent panels 13.

As a unique feature of the present invention, each of the matrix boards 13 are of identical construction, each board (two of which are shown in FIG. 2) having its apertures 24 formed of the same number, shape, and in the same relative position, as those contained in adjacent boards or panels. Furthermore, each of the panels 13 (and consequently the apertures 24) are so aligned with respect to one another that the light beams 22, when uninterrupted, pass through correspondingly disposed apertures of adjacent panels to impinge upon, and be reflected by, reflector means 25 angularly mounted in any conventional manner within the end cap 12 (FIG. 3). Thus, each of the uninterrupted beams 22 are respectively redirected to impinge upon an array of photodetectors 26, which photodetectors are of a number and spacing corresponding to the number and spacing of the apertures 24. Specifically, and as an example, a light ray 22 passing through the last aperture **24*a* of the first row thereof will, if uninterrupted, impinge upon the last photodetector 26*a* of the second row, as illustrated in FIG. 3**.

In accordance with a specific feature of the present invention, the array of photodetectors 26 is uniquely disposed in a first area 27 at the top surface of a printed circuit board 28 longitudinally extending through the housing. Also disposed at the top surface of the board 28 and longitudinally spaced therefrom in an area 29 is a network of circuit components (not shown) coupled to the outputs from each photodetector by way of interconnections disposed along or within the printed circuit board. The network within the area 28 will normally include logic circuitry for converting the signals received from the selectively illuminated photodetectors (in a manner conventionally known) into binary electrical signals which are then inputted by way of a connector cable 80 to the data processing or other utilization apparatus. The details of the operation of, and interconnections between, the matrix of photocells 26, and the logic network within the area 29 is conventional, does not form part of the invention hereof, and therefore needs not be described in any further detail.

In order to maintain the required alignment of the adjacent panels 13 (and consequently the matrix of apertures 24) with respect to one another, as well as with respect to the matrix of photocells 26, aligned notches 30 are provided in each of the boards 13 at the opening 57 through which the circuit board 28 passes to rigidly hold the panels and circuit board in predetermined aligned relationship. Furthermore, this feature enables the replacement of circuit boards having the photodetector matrix thereon while assuring that each photocell matrix will be properly aligned with respect to the deflected beams 22. It is also apparent that the rods 14 assist in maintaining the accurate alignment between adjacent boards.

Disposed between each of the matrix panels 13 are light shutters or masks 40 having light transparent portions or openings 41 of predetermined shapes and sizes. Each key 19 is secured to an extension 42 on the shutter, and when depressed, causes the shutter 40 to be downwardly translated to interrupt light beams passing through the apertures 24 except where the openings 41 are aligned with these apertures, the uninterrupted beams reaching the photodetector matrix. A spring 44 disposed over the extension 42 enables the upward translation of the shutter 40 out of such light interrupting relationship when the key is released.

While only one such shutter 40 is illustrated in FIG. 2, it is to be understood that there would be a large number of these shutters corresponding to, and coupled with, each of the keys 19, each shutter having a characteristic and unique pattern of openings 41 for respectively coupled keys 19, thereby enabling the interruption of different sets of beams 22 for, and the consequent provision of a coded output uniquely characteristic of, the key being depressed.

As previously described, the coded shutters or light masks 40 will be alternately disposed between the matrix panels 13. The relationship of one such shutter with one paired set of panels, as well as the detailed construction of the shutter and the matrix panels, are illustrated in FIGS. 4–7. Accordingly, each of the matrix boards 13 has at one face thereof laterally extending wall portions 51 and 52 and vertically extending wall portions 53 defining a generally rectangular shaped recess 50 in which the shutter 40 coupled to each key 19 is adapted to be received for vertical translation therein.

Disposed along the wall portions 51 and 52 are a plurality of mutually aligned paired sets of notches 54 and **54*a*, respectively, each paired set adapted to slidably receive the extensions 42 and 42*a* of the shutter. Since each of the matrix panels will be of identical construction and have a plurality of these paired sets of notches, there being four such sets in the illustrated embodiment, by disposing the extensions 42 and 42*a* at different lateral locations along the shutter body, adjacent shutters coupled to keys 19 may be staggered in the manner illustrated in FIG. 3**.

It is also briefly mentioned that another rectangular shaped recess 55 having aligned slots 56 and **56*a* may be disposed, if desired, on an opposite face of the matrix panel 13 for receiving a shutter coupled, for example, to the space bar 19*a*. An opening 60** may be provided in the panel to allow for the passage of elongated connecting means between this shutter and the space bar.

As previously described, each of the matrix panels includes the openings 15 adapted to receive the elongated rods 14; and the opening 57 with the slots 30 for receiving and holding the circuit board 28.

Figure 4:
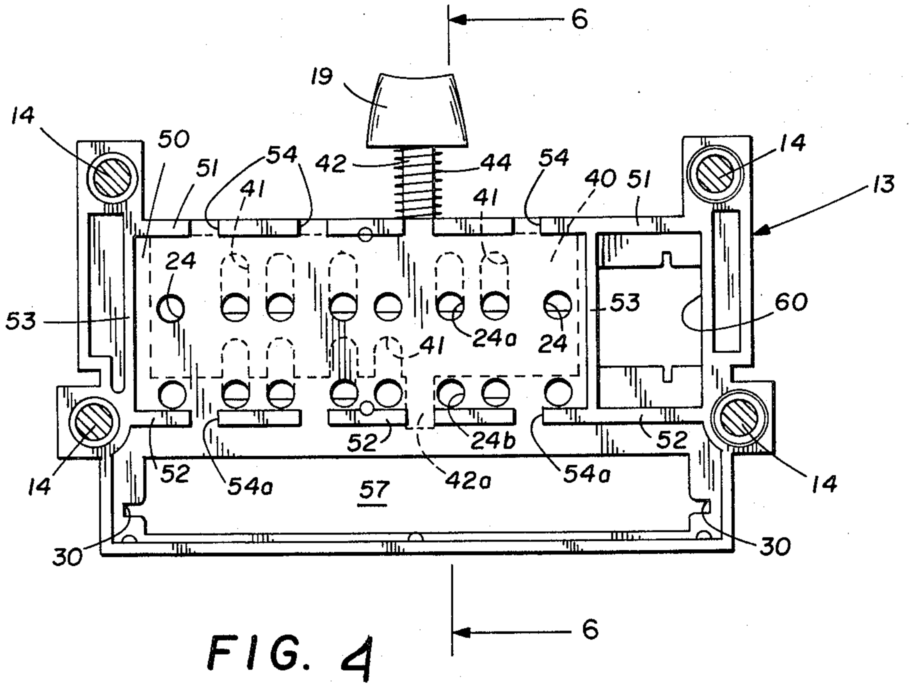
FIG. 4 is an elevational view showing the construction of, and interrelationship between, a coded shutter positioned between two matrix panels, in accordance with the construction of the apparatus of the present invention.
Figure 5:
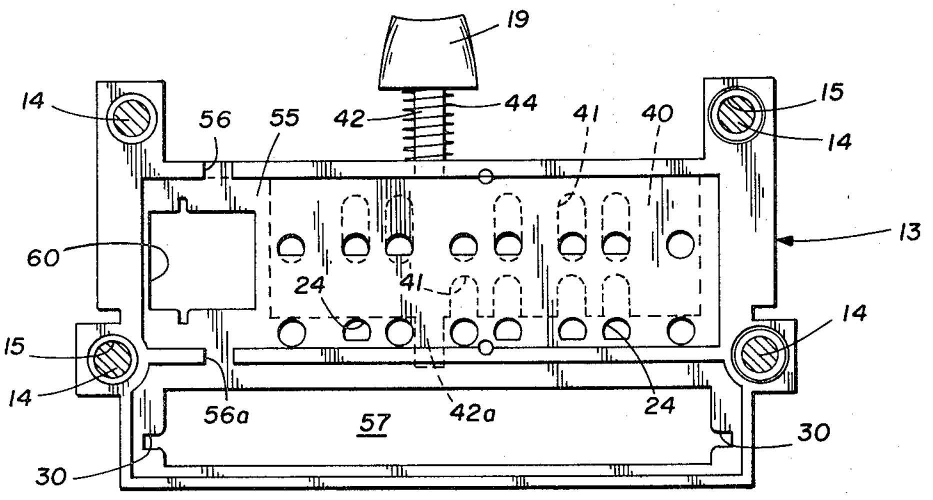
FIG. 5 is an elevational view similar to that depicted in FIG. 4 viewed from the opposite side thereof.

The apertures 24 in the panels 13 can be formed of any shape or number, and positioned in any desired arrangement, the only limitation being that the shape, number, and position of the apertures in all panels should be identical, and should positionally correspond to the arrangement of the photocells 26. As illustrated in FIGS. 4 and 5, selected ones of the apertures 24 can have a flat surface (be "D" shaped) so that light beams passing therethrough can be interrupted sooner than light beams passing through the entirely circular shaped holes.

Figure 6:
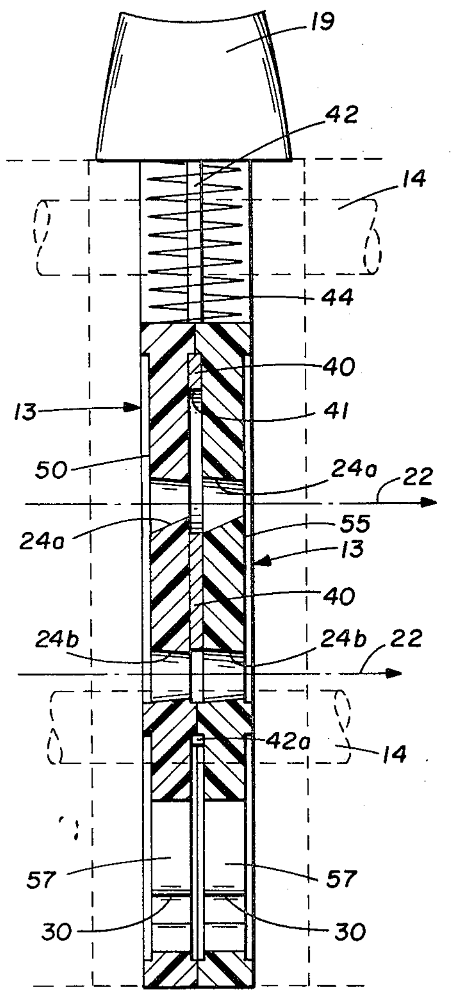
FIG. 6 is a partial sectional view of the structure depicted in FIG. 4, taken along the section lines 6—6.
Figure 7:
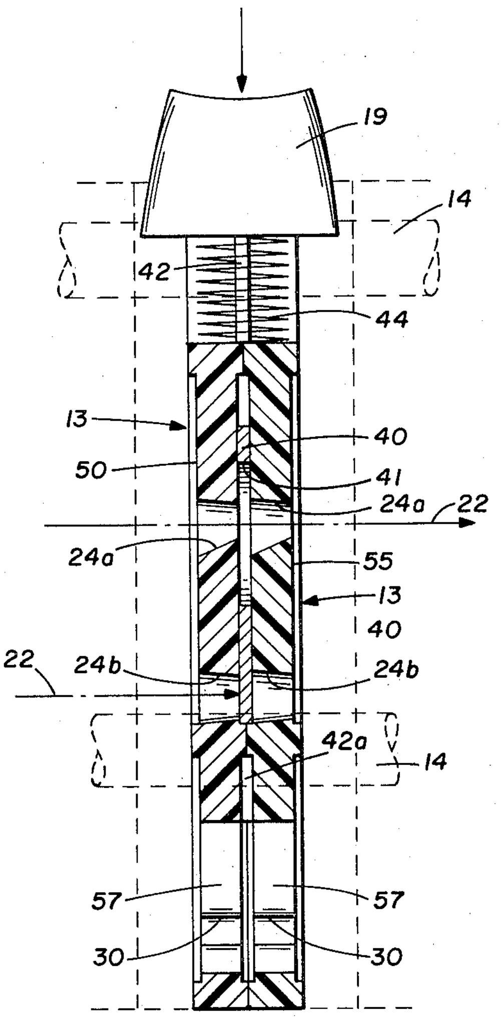
FIG. 7 is a partial sectional view similar to FIG. 6 with the key in the depressed position.

As a particular feature of the invention, and as specifically illustrated in the sectional views of FIGS. 6 and 7, each of the apertures 24 is tapered along the longitudinal direction of the housing. It has been found that this tapering prevents the transmission of reflected light in the housing from undesirably passing through the aligned apertures 24, and thus assures that only light from the collimated beams 22 that is not to be interrupted reached the photodetector matrix.

The coded shutter 40 has the pattern of apertures or transparent portions 41 selectively disposed thereon so that the depression of the key 19 will selectively position these transparent portions between and with certain aligned apertures 24 to provide uninterrupted transmission of the light beam therethrough, while at the same time disposing a portion of the body of the shutter 40 between other aligned apertures 24, to prevent the transmission of light therethrough. This can be specifically seen in FIG. 6 and 7 where light beams passing through the apertures 24*a* and 24*b* in FIG. 6 are selectively interrupted by the depression of the key 19 (FIG. 7) to interrupt the transmission of the light beam through the apertures 24*b*.

Various other modifications may be made to the disclosed embodiment of the invention, as well as alternate embodiments may be provided, without departing from the spirit and the scope of the invention as defined by the appended claims.

What is claimed is:

1. Keyboard apparatus of the type for providing coded electrical signals corresponding to information represented by the keys of said keyboard in response to the selective depression of said keys, said apparatus comprising:

a. a light enclosing housing defined by first and second end cap means spaced from one another in a longitudinal direction and a plurality of adjacently disposed matrix panels in face-engaging relationship disposed between said first and second end caps, each of said matrix panels having a major disposed in a position transverse to said longitudinal direction, b. light source means disposed at said first end cap for directing light toward said second cap through said housing, c. a matrix of photodetectors disposed at said second end cap means, said photo-detector matrix having aligned rows of photodetectors, d. each of said matrix panels having a matrix of apertures in said major face corresponding to the photodetector matrix for forming said light into a plurality of collimated beams which, when uninterrupted, respectively impinge on different ones of said photodetectors, corresponding apertures in each of said matrix panels being aligned with one another in said longitudinal direction, e. each of said matrix panels also having a recess disposed in said major face and a plurality of notches communicating with said recess and laterally disposed along said panel, the distance between each of the notches of one panel being equal to the distance between the notches of the other panels, f. a keyboard disposed at the top of said housing, and g. light masks respectively disposed between adjacent ones of said matrix panels and respectively translatably mounted within said recesses, each of said light masks having extension means respecively coupled to the keys of said keyboard, said masks further having transparent and opaque portions arranged in a manner to uniquely define a characteristic code pattern corresponding to the key to which it is coupled, whereby the depression of selected ones of said keys correspondingly translates the coupled mask to position selected ones of said transparent and opaque portions between said aligned apertures to selectively interrupt said different sets of collimated beams.

h. the extension means of adjacent light masks being respectively slidably received within non-corresponding ones of said notches in adjacent matrix panels.

2. The apparatus as defined by claim 1 wherein said photodetector matrix is disposed within a first area on a circuit board extending in said longitudinal direction, and means are provided at said second end cap for reflecting said beams toward said photodetectors.

3. The apparatus as defined by claim 2 wherein each of said matrix panels has a laterally extending opening for receiving said circuit board.

4. The apparatus as defined by claim 3 wherein said laterally extending opening has a pair of opposed notch portions for maintaining said photodetector matrix in fixed relationship with said matrix of apertures.

5. The apparatus as defined by claim 2 wherein said circuit board includes a second area disposed in a longitudinal direction from said first area, and logic network means is disposed within said second area electrically coupled to the outputs from said photodetectors.

6. The apparatus as defined by claim 4 wherein said circuit board includes a second area disposed in a longitudinal direction from said first area, and logic network means is disposed within said second area electrically coupled to the outputs from said photodetectors.

7. The apparatus as defined by claim 1 wherein the apertures of said matrix panels are tapered in the direction of the collimated light beams.

8. The apparatus as defined by claim 5 wherein the apertures of said matrix panels are tapered in the direction of the collimated light beams.

9. Optical switching keyboard apparatus, comprising:

a. a light enclosing housing defined by first and second end cap means longitudinally spaced from one another and a plurality of adjacently disposed matrix panels in face-engaging relationship disposed between said first and second end caps, each of said matrix panels being disposed in a position transverse to said longitudinal direction, b. light source means including a parabolic reflector disposed within said first end cap for directing light toward said second cap through said housing, c. a matrix of photodetectors in aligned rows and columns disposed within a first area within the confines of said second end cap upon a circuit board extending in said longitudinal direction, d. mirror means provided at said second cap for redirecting said light at said photodetectors, e. each of said matrix panels having aligned rows of apertures therein corresponding to the aligned rows of said photodetector matrix for forming said light into a plurality of collimated beams which, when uninterrupted, respectively impinge on different ones of said photodetectors, corresponding apertures in each of said matrix panels being aligned with one another in said longitudinal direction, f. each of said matrix panels having a laterally extending opening with opposed notch portions for receiving said circuit board and maintaining selected ones of said photodetectors in alignment with said matrix panel apertures, each said panels furthermore having a recess disposed in a transverse face thereof, and a plurality of notches communicating with said recess and laterally disposed along said panel the distance between each of the notches of one panel being equal to the distance between the notches of the other panels, g. a keyboard disposed at the top of said housing, and h. light masks respectively disposed between adjacent ones of said matrix panels and translatably mounted within said recesses, each of said light masks having extension means respectively coupled to the keys of said keyboard, said masks further having transparent and opaque portions arranged in a manner to uniquely define a characteristic code pattern corresponding to the key to which it is coupled, whereby the depression of selected ones of said keys correspondingly translates the coupled mask to position selected ones of said transparent and opaque portions between said aligned apertures to selectively interrupt said collinated beams, i. the extension means of adjacent light masks being respectively slidably received within non-corresponding ones of said notches in adjacent matrix panels.

10. The apparatus as defined by claim 9 further including longitudinally extending rods passing through aligned openings in said matrix panels to hold said panels and said end caps in assembled relationship.

11. The apparatus as defined by claim 9 wherein the apertures of said matrix panels are tapered in the direction of the collimated light beams.

12. The apparatus as defined by claim 11 wherein selected ones of said apertures of said panels are of different configuration than other ones of said apertures.

13. Apparatus of the type for providing encoded signals indicative of information associated with the keys of a keyboard in response to the selective depression of said keys, said apparatus comprising:

a. a light enclosing housing comprising, in assembled relationship, longitudinally opposed end cap means between which are disposed a plurality of adjacently situated matrix panels having major faces thereof positioned transverse to said longitudinal direction, said matrix panels having a construction wherein:

(i) light transmitting portions are disposed along the major face of said panels and mutually aligned with corresponding light transmitting portions of adjacent matrix panels so that light longitudinally directed through said housing at said panels, when uninterrupted, is formed into a plurality of collimated beams, and (ii) recesses are respectively disposed in said major faces thereof with notches in said panels corresponding to the placement of said keys of said keyboard communicating with said recesses;

b. light source means located at one of said end cap means for directing light through said light transmitting portions toward said opposed end cap means, thereby to form said collimated beams;

c. photodetecting means disposed at said opposed end cap means comprising a plurality of photodetectors for producing said encoded signals in response to the selective impingement of said collimated beams on said photodetectors; and d. light masks respectively disposed between adjacent ones of said matrix panels and respectively translatably mounted within said recesses, each of said light masks respectively coupled by coupling means with the keys of said keyboard, said masks further having transparent and opaque portions arranged in a manner to uniquely define a characteristic code pattern corresponding to the key to which it is coupled, whereby the depression of selected ones of said keys correspondingly translates the coupled mask to position selected ones of said transparent and opaque portions between different sets of said aligned light transmitting portions to selectively interrupt said collimated beams, the coupling means associated with the light masks being respectively translatably received within different ones of said notches.

* * * * *

UNITED STATES PATENT OFFICE
CERTIFICATE OF CORRECTION

Patent No. 3,818,485 Dated June 18, 1974

Inventor(s) Wesley V. Harrison; Wilbur A. Foster

It is certified that error appears in the above-identified patent and that said Letters Patent are hereby corrected as shown below:

Column 3, Line 59, "28" should be --29--.

Column 5, Line 26, "reached" should be --reaches--;

Line 58, after "major", insert --face--.

Column 6, Lines 25-27, should read "transparent and opaque portions between different sets of said aligned apertures to selectively interrupt said collimated beams,".

Column 7, Line 29, after "panel", insert a comma (,);

Line 46, after "between", should be inserted --different sets of--.

Signed and sealed this 15th day of October 1974.

(SEAL)
Attest:

McCOY M. GIBSON JR.
Attesting Officer

C. MARSHALL DANN
Commissioner of Patents